United States Patent Office 3,478,110
Patented Nov. 11, 1969

3,478,110
HOMOPOLYMERIZATION OF POLY-HALOGENOUS ALKYLENE OXIDES
Pauls Davis, Gibraltar, and Herwart C. Vogt, Grosse Ile, Mich., assignors to Wyandotte Chemicals Corporation, Wyandotte, Mich., a corporation of Michigan
No Drawing. Filed Sept. 26, 1966, Ser. No. 581,765
Int. Cl. C08g 23/14
U.S. Cl. 260—615                                7 Claims

ABSTRACT OF THE DISCLOSURE

Polyhalogenous alkylene oxides are homopolymerized in the presence of a solvent and a catalyst. The solvents which may be used include difluorodichloromethane and 1,2-dichloro-1,1,2,2-tetrafluoroethane. The catalysts which may be used include Lewis acid catalysts with boron trifluoride being preferred.

---

The present invention relates to the homopolymerization of polyhalogenous alkylene oxides. It is more particularly concerned with a process of homopolymerizing polyhalogenous alkylene oxides to provide polymers which have excellent resistance to chemical action and to fire. These polymers are useful for the production of various resinous products, as well as for further reaction with other materials to form useful plastic and rubber compositions.

Processes for preparing polymers by the reaction of polyhalogenous alkylene oxides with ethylenically-unsaturated and polyhydric alcohols are known in the art, for example, as shown in U.S. Patents 3,077,467 and 3,244,754. A process for the polymerization of 1,4-dichloro-2,3-epoxybutane is disclosed by U.S. Patent 3,065,188.

An object of the invention is the provision of a method of preparation of homopolymers of highly halogenated polyhalogenous alkylene oxides. Additional objects will be apparent to one skilled in the art and still other objects will become apparent hereinafter.

It has now been found that the foregoing and additional objects can be accomplished by providing a novel method for the homopolymerization of polyhalogenous alkylene oxides. The resulting homopolymers are characterized by the presence of pendant alkyl groups having up to two carbon atoms and containing at least two halogen atoms bonded to the same terminal carbon atom. These homopolymers may be represented by the structural formula:

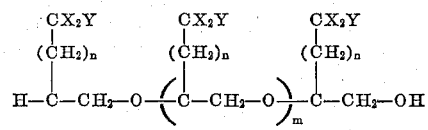

where X is chlorine, bromine, or fluorine, Y is chlorine, bromine, fluorine or hydrogen, $m$ is an integer such that the molecular weight of the homopolymer is from at least 1000 up to about 50,000, and $n$ is zero or 1. In general, the homopolymers are produced by the novel process which comprises:

(1) Maintaining a selective solvent in a liquid state, e.g., by cooling the selective solvent to a temperature below its boiling point or by keeping the solvent under sufficient pressure to liquify it, (2) Adding the polyhalogenous alkylene oxide to the liquid solvent in the presence of a catalyst, whereby an immediate precipitate is formed, and (3) Recovering the homopolymer from the slurry.

The polyhalogenous alkylene oxides which are employed as starting materials to prepare the homopolymers of this invention are the vicinal alkylene oxides containing from three to four carbon atoms, and have attached to a carbon atom of the oxirane ring an alkyl group having up to two carbon atoms and containing at least two and preferably three halogen atoms attached to the terminal carbon atom. In addition, when the alkyl group contains two carbon atoms, the second carbon atom may also contain halogen substituents. The term "oxirane ring" refers to a three-membered cyclic ether group represented by the formula:

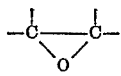

wherein the ether oxygen is bonded to adjacent carbon atoms. Representative of such polyhalogenous alkylene oxides are 1,1-dichloro-2,3-epoxypropane, 1,1,1-trichloro-2,3-epoxypropane, 1,1,1-trifluoro-2,3-epoxypropane, 1-bromo-1,1-dichloro-2,3-epoxypropane, 1,1-dichloro-1-fluoro-2,3-epoxypropane, 1,1-difluoro-1-chloro-2,3-epoxypropane, and other mixed 1,1,1-trihalo-2,3-epoxypropanes, 1,1,1-tribromo-3,4-epoxybutane, 1,1,1-trichloro-3,4-epoxybutane, 1,1-dichloro-3,4-epoxybutane and other 1,1,1-trihalo-3,4-epoxybutanes. As is obvious from these examples, the halogens bonded to these polyhalogenated alkylene oxides, and consequently to the pendant polyhalogenoalkyl groups of the polyhalogenous homopolymers, may be any halogen or mixture of halogens. Of the halogens, those having atomic weights of 19 to 80, including fluorine, chlorine and bromine can be used, with chlorine being preferred. Preferably, all three of the substitutable valences of the terminal carbon atom of the polyhalo alkyl group are satisfied by halogen atoms. The polyhalogenous alkylene oxide compounds that may be homopolymerized within the scope of this invention may be represented by the structural formula:

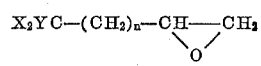

wherein X is chlorine bromine, or fluorine; Y is chlorine, bromine, fluorine, or hydrogen; and $n$ is zero or 1.

The polyhalogenous epoxy propanes used in the present invention for the preparation of the homopolymers may be prepared by known methods such as by the dehydrohalogenation of the appropriate polyhalogenated secondary alcohol in sodium hydroxide solution. For example, 1,1-dichloro-2,3-epoxypropane may be prepared by the dehydrohalogenation of 1,1,3-trichloro-2-propanol. 1,1,1-trichloro-2,3-epoxypropane may be prepared by the dehydrohalogenation of 1,1,1,3-tetrachloro-2-propanol. The propanol used in the process may in turn be prepared in known matter by the reduction of the appropriate halogenated acetone with aluminum isopropoxide and isopropanol.

The polyhalogeno-3,4-epoxybutanes may be prepared by reacting the appropriate polyhalomethane with 1-hydroxypropene-2 in the presence of a source of free radicals, and dehydrohalogenating the resulting adduct with a base, as described in Canadian Patent No. 527,462. 1,1,1-trichloro-3,4-epoxybutane may be prepared by the partial dehydrohalogenation of 1,1,1-trichloro-3-bromo-4-butanol in the presence of potassium hydroxide, as disclosed in U.S. Patent No. 2,561,516.

When the polyhalogenous alkylene oxides react, the oxirane ring is opened with the breaking of an oxygen bond to form a bivalent radical. The members of the oxirane ring groups form a bivalent linear chain having a polyhalogenous lower alkyl group, originally attached to a carbon atom of the oxirane ring, as an extra linear substituent. The bivalent oxyalkylene radical may be bonded through each valence to another bivalent oxyalkylene radical which in turn is bonded to yet another bivalent oxyalkylene radical, and so forth, to form the polyhalogenous alkylene oxide homopolymers.

The prior art polymerizations are performed in the presence of solvent as, for instance, in the presence of aliphatic or aromatic hydrocarbons or halogenated aliphatic hydrocarbons. The reaction temperature for these polymerizations varies between about −25° C. and the boiling point of the starting materials or solvents. The catalysts are employed in quantities up to about 10%. However, it has been discovered that the highly halogenated alkylene oxide compounds cannot be homopolymerized by some of the methods used in the prior art. It was found that certain selected solvents will cause homopolymerization while other typical hydrocarbon solvents will not result in the production of homopolymers in any significant yields. The solvents that may be used in the process of this invention are selected from the group consisting of difluorodichloromethane and 1,2-dichloro-1,1,2,2-tetrafluoroethane. It is noted that solvents of the same class of compounds as the aforementioned solvents, such as trichloromonofluoromethane shown in Example 5, do not work in the process.

The homopolymerization reaction is conducted in the presence of a catalytic amount of a Lewis acid catalyst. Generally, the Lewis acid is employed in an amount from about 0.5 to 40 percent by weight of the polyhalogenous alkylene oxide. Any Lewis acid may be employed. For example, boron trifluoride, boron trifluoride etherate, boron trichloride, aluminum chloride, titanium tetrachloride, antimony trichloride and ferric chloride. Boron trifluoride is the preferred catalyst since a high molecular weight polyhalogenous homopolymer is obtained.

The present invention will be more readily apparent from a consideration of the following illustrative examples which are not to be construed as limiting the invention.

Example 1

In a two-liter jacketed resin kettle 500 ml. of dichlorodifluoromethane was cooled to about −31° C. One mole (161 grams) of 1,1,1-trichloro-2,3-epoxypropane was then added to the cooled dichlorodifluoromethane. This addition resulted in a clear solution. The clear solution was vigorously agitated while about 250 ml. (about 0.7 gram or 0.01 mole) of boron trifluoride gas ($BF_3$) was being added. An immediate precipitate formed from the exothermic reaction. The resulting slurry was kept at about −35° C. for approximately one hour, at which time one liter of methanol was added to destroy the catalyst. The dichlorodifluoromethane was evaporated and the solid polymer was filtered and washed with additional methanol. The polymer was dried overnight at room temperature at about 0.5 mm. Hg. A yield of 104 grams was obtained. The polymer was insoluble in water and methanol, partially soluble in acetone, and soluble in benzene, hexane, ethyl acetate, dioxane, carbon tetrachloride and other typical organic solvents.

The molecular weight of the 1,1,1-trichloropropane-2,3-epoxypropane homopolymer as determined by the standard boiling point elevation method in benzene using Cottrell's ebullioscope was 5000. See Technique of Organic Chemistry, vol. I, Physical Methods, Third Edition, A. Weissberger, editor, Part I, Chapter VIII, pp. 368–373, 395–398, Interscience Publishers, Inc., N.Y., 1959, QD 251.W3683. The homopolymer melted at 99° C. by the Durrans Mercury method, flowed at about 220° C. and underwent slight decomposition at 285° C. A film was cast from a solution of the polymer in methylene chloride which showed good clarity.

Example 2

About 50 ml. of dichlorodifluoromethane solvent was placed in a test tube. The solvent was cooled to about −30° C. and 9 grams of 1,1,1-trichloro-2,3-epoxypropane was added thereto. About 30 ml. of boron trifluoride gas was bubbled into the clear solution of 1,1,1-trichloro-2,3-epoxypropane and dichlorodifluoromethane. A very rapid exothermic reaction took place and the polymer precipitated from the solution. About 7 grams of the homopolymer of 1,1,1-trichloro-2,3-epoxypropane was recovered. The recovered polymer had physical characteristics similar to those of the polymer from Example 1.

Example 3

About 50 ml. of hexane solvent was placed in a test tube and cooled to about −30° C. Four grams of 1,1,1-trichloro-2,3-epoxypropane was added to the solvent and 15 ml. of boron trifluoride gas was bubbled into the solution. An oily, slightly gummy precipitate of low molecular weight was obtained indicating the possibility of some polymerzation. No pronounced exothermic reaction could be observed.

Example 4

About 50 ml. of carbon tetrachloride solvent was placed in a test tube and cooled to about −30° C. Eight grams of 1,1,1-trichloro-2,3-epoxypropane was added to the carbon tetrachloride and about 30 ml. of boron trifluoride gas was bubbled through the solution. No appreciable reaction was observed.

Example 5

About 50 ml. of trichloromonofluoromethane solvent was put in a test tube and cooled to about −30° C. Ten grams of 1,1,1-trichloro-2,3-epoxypropane was added to the trichloromonofluoromethane and 30 ml. of boron trifluoride gas was bubbled through the solution. No noticeable reaction could be observed.

Example 6

About 50 ml. of vinyl chloride was placed in a test tube and cooled to about −30° C. Six grams of 1,1,1-trichloro-2,3-epoxypropane was added to the vinyl chloride and about 100 ml. of boron trifluoride gas was bubbled through the solution. No reaction could be observed. About 4 ml. of butadiene was then added in an attempt to initiate a reaction; however, no reaction could be observed.

Example 7

In a two-liter jacket resin kettle, 500 ml. of 1,2-dichloro-1,1,2,2-tetrafluoroethane is cooled to about 0° C. About 161 grams of 1,1,1-trichloro-2,3-epoxypropane is added to the cooled 1,2-dichloro-1,1,2,2-tetrafluoroethane. The resulting clear solution is vigorously agitated while about 250 ml. (about 0.7 gram or 0.01 mole) of boron trifluoride gas is being bubbled through the solution. An immediate precipitate is formed and the slurry is maintained at about 0° C. for about one hour to ensure a complete reaction. About one liter of methanol is added to deactivate the catalyst. The dichlorotetrafluoroethane is evaporated and the resulting solid homopolymer is washed with additional methanol and dried. The homopolymer's characteristics are similar to those of the homopolymer of Example 1.

Example 8

Using the procedure of Example 1, about 176 grams of 1,1,1-trichloro-3,4-epoxybutane is homopolymerized in dichlorodifluoromethane. About 109 grams of a homopolymer is obtained that is soluble in benzene, hexane, ethyl acetate, dioxane, carbon tetrachloride and other typical organic solvents, partially soluble in acetone, and insoluble in water and methanol. The molecular weight is about 3780. The homopolymer melts at about 105° C., flows at about 225° C., and starts to decompose at about 295° C.

Example 9

Using the procedure of Example 7, about 176 grams (one mole) of 1,1,1-trichloro-3,4-epoxybutane is homopolymerized in 1,2-dichloro-1,1,2,2-tetrafluoroethane. 104 grams of homopolymer is recovered having physical characteristics similar to the homopolymer of Example 8.

Examples 3, 4 and 6 show that the use of the common organic solvents in the process of this invention does not result in the desired homopolymerization of the polyhalogenous alkylene oxide. Example 5 shows that the solvent trichloromonofluoromethane does not work in the process of this invention.

What is claimed is:

1. The process of polymerizing a polyhalogenous alkylene oxide compound of the formula:

(I)  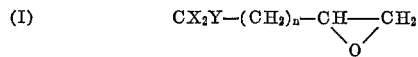

wherein X is chlorine, bromine or fluorine, Y is chlorine, bromine, fluorine or hydrogen, and $n$ is zero or 1, which comprises the steps of:
   (1) maintaining a solvent selected from the group of dichlorodifluoromethane and 1,2-dichloro-1,1,2,2-tetrafluoroethane in the liquid state,
   (2) adding said compound (I) to said liquid solvent in the presence of a catalytic amount of a Lewis acid catalyst whereby an immediate precipitate is formed, and
   (3) recovering a homopolymer of a polyhalogenous alkylene oxide from the reaction mixture.

2. The process of claim 1 wherein X is chlorine.

3. The process of claim 1 wherein X is chlorine and Y is chlorine.

4. The process of claim 1 wherein $n$ is zero, X is chlorine, and Y is chlorine.

5. The process of claim 4 wherein the solvent is dichlorodifluoromethane.

6. The process of claim 5 wherein said solvent is cooled to −30° C.

7. The process of claim 5 wherein the process is conducted at superatmospheric pressure.

References Cited

UNITED STATES PATENTS

| | | |
|---|---|---|
| 3,065,188 | 11/1962 | Vandenberg. |
| 3,135,705 | 6/1964 | Vandenberg. |
| 3,158,581 | 11/1964 | Vandenberg. |
| 3,244,754 | 4/1966 | Bruson et al. |
| 3,311,570 | 3/1967 | Vandenberg ---------- 260—2 |
| 3,337,475 | 8/1967 | Fukui et al. |
| 3,342,875 | 9/1967 | Selman et al. |
| 3,355,397 | 11/1967 | Warnell. |
| 3,375,207 | 3/1968 | Kaufman. |

FOREIGN PATENTS 528,136  7/1956  Canada.

OTHER REFERENCES

Smith et al., Ind. and Eng. Chem., vol. 49, No. 8 (1957) pp. 1241–1246.

Jones et al., Jour. Polym. Sci., vol. 26 (1957) pp. 81–88.

LEON ZITVER, Primary Examiner

H. T. MARS, Assistant Examiner

U.S. Cl. X.R.

260—2